United States Patent
Nilsson et al.

(10) Patent No.: US 12,096,089 B2
(45) Date of Patent: Sep. 17, 2024

(54) ADAPTIVE BIT RATE STREAMING

(71) Applicant: BRITISH TELECOMMUNICATIONS PUBLIC LIMITED COMPANY, London (GB)

(72) Inventors: Michael Nilsson, London (GB); Paul Farrow, London (GB); Tomasz Lyko, London (GB); Matthew Broadbent, London (GB); Nicholas Race, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/027,042

(22) PCT Filed: Sep. 24, 2021

(86) PCT No.: PCT/EP2021/076417
§ 371 (c)(1),
(2) Date: Mar. 17, 2023

(87) PCT Pub. No.: WO2022/064015
PCT Pub. Date: Mar. 31, 2022

(65) Prior Publication Data
US 2023/0328334 A1  Oct. 12, 2023

(30) Foreign Application Priority Data
Sep. 28, 2020 (GB) .................................... 2015327

(51) Int. Cl.
*H04N 21/462* (2011.01)
*H04N 21/24* (2011.01)
(Continued)

(52) U.S. Cl.
CPC ... *H04N 21/64769* (2013.01); *H04N 21/2402* (2013.01); *H04N 21/26216* (2013.01);
(Continued)

(58) Field of Classification Search
None
See application file for complete search history.

(56) References Cited

U.S. PATENT DOCUMENTS

| 8,218,657 B2 | 7/2012 | Spilo |
| 8,578,436 B2 | 11/2013 | Li et al. |

(Continued)

FOREIGN PATENT DOCUMENTS

| CN | 107809648 | 3/2018 |
| EP | 2 658 167 | 10/2013 |

OTHER PUBLICATIONS

Combined Search and Examination Report for GB Application No. 2015327.6 dated Feb. 25, 2021, 6 pages.

(Continued)

*Primary Examiner* — William J Kim
(74) *Attorney, Agent, or Firm* — Nixon & Vanderhye P.C.

(57) ABSTRACT

Described is a method of media content delivery, where measurements of network delivery rates are used to determine at which bit rate to request each content segment. The aim is to ensure continuous play-out of good quality segments, without relying on a large buffer, so that end-to-end delay is kept low. The historical network delivery rate is measured on two or more timescales, such as a short-term delivery rate and a long-term delivery rate, and these are used to decide when to request a higher bit rate segment than the previous segment, and when to request a lower bit rate segment than the previous segment.

4 Claims, 2 Drawing Sheets

(51) Int. Cl.
    *H04N 21/262*     (2011.01)
    *H04N 21/442*     (2011.01)
    *H04N 21/647*     (2011.01)
    *H04N 21/845*     (2011.01)

(52) U.S. Cl.
    CPC ... *H04N 21/44209* (2013.01); *H04N 21/4621* (2013.01); *H04N 21/8456* (2013.01)

(56) References Cited

U.S. PATENT DOCUMENTS

| | | | |
|---|---|---|---|
| 9,462,032 | B2 | 10/2016 | Lieber |
| 9,819,597 | B2* | 11/2017 | Knittle .................... H04L 47/25 |
| 9,986,008 | B2 | 5/2018 | Ramamurthy et al. |
| 10,432,686 | B1 | 10/2019 | Wu et al. |
| 2005/0120038 | A1* | 6/2005 | Jebb .................... H04N 21/2402 707/999.102 |
| 2005/0172028 | A1* | 8/2005 | Nilsson ............ H04N 21/44016 375/E7.014 |
| 2012/0117225 | A1* | 5/2012 | Kordasiewicz ...... H04N 17/004 709/224 |
| 2013/0227122 | A1* | 8/2013 | Gao ................. H04N 21/23439 709/224 |
| 2013/0263200 | A1* | 10/2013 | Li .................... H04N 21/23418 725/116 |
| 2014/0019635 | A1 | 1/2014 | Reznik et al. |
| 2014/0156863 | A1* | 6/2014 | Gao ........................ H04L 65/60 709/231 |
| 2015/0201226 | A1* | 7/2015 | Hunt .................... H04N 21/238 725/96 |
| 2015/0215361 | A1 | 7/2015 | Gigliotti |
| 2017/0054775 | A1 | 2/2017 | Andersson et al. |
| 2019/0364311 | A1* | 11/2019 | Nilsson .............. H04N 21/8456 |
| 2020/0037007 | A1* | 1/2020 | Mahvash ......... H04N 21/44004 |
| 2020/0037015 | A1* | 1/2020 | Mahvash ......... H04N 21/44209 |
| 2020/0037045 | A1* | 1/2020 | Mahvash ........... H04N 21/8456 |
| 2021/0144080 | A1* | 5/2021 | Ni ...................... H04N 21/8456 |
| 2021/0152882 | A1* | 5/2021 | Xie .................... H04N 21/2225 |

OTHER PUBLICATIONS

Combined Search and Examination Report for GB Application No. 2113731.0 dated Mar. 28, 2022, 7 pages.
International Search Report and Written Opinion of the ISA for PCT/EP2021/076417 dated Dec. 21, 2021, 13 pages.
Examination Report under Section 18(3) dated Mar. 10, 2023, issued for GB Application No. GB2113731.0 (4 pages).
International Preliminary Report on Patentability dated Apr. 6, 2023, issued for International Application No. PCT/EP2021/076417 (8 pages).
Junchen Jiang et al., "Improving Fairness, Efficiency, and Stability in HTTP-Based Adaptive Video Streaming With Festive", IEEE/Acm Transactions on Networking, vol. 22, No. 1, Feb. 2014 (15 pages).
Selvaraj Kesavan et al., "Effective client-driven three-level rate adaptation (TLRA) approach for adaptive HTTP streaming", Multimed Tools Appl (2018) 77:8081-8114, DOI 10.1007/s11042-017-4705-y, Springer Science+Business Media, New York, 2017, Published online: May 9, 2017 (34 pages).
Qi Lin et al., "Bandwidth Estimation of Rate Adaption Algorithm in DASH", Beijing University of Posts and Telecommunications, Beijing 100876, China, 2014 IEEE (5 pages).
Chenghao Liu et al., "Rate adaptation for dynamic adaptive streaming over HTTP in content distribution network", Signal Processing: Image Communication, Article in Press, 2011 Elsevier B.V. (24 pages).
THEO Blog, Reduce buffering with a faster adaptive bitrate, Apr. 29, 2016, THEO Technologies (5 pages).
Yusuf Sani et al., "Adaptive Bitrate Selection: A Survey", IEEE Communications Surveys & Tutorials, vol. 19, No. 4, Fourth Quarter 2017 (30 pages).
Guibin Tian et al., "Towards Agile and Smooth Video Adaptation in HTTP Adaptive Streaming", IEEE/ACM Transactions on Networking, vol. 24, No. 4, Aug. 2016 (14 pages).

* cited by examiner

ADAPTIVE BIT RATE STREAMING

CROSS-REFERENCE TO RELATED APPLICATIONS

This application is the U.S. national phase of International Application No. PCT/EP2021/076417 filed Sep. 24, 2021 which designated the U.S. and claims priority to GB Patent Application No. 2015327.6 filed Sep. 28, 2020, the entire contents of each of which are hereby incorporated by reference.

FIELD OF THE INVENTION

This invention relates to the field of content delivery.

BACKGROUND TO THE INVENTION

Video content is currently delivered to a range of client devices using unicast delivery, where a single stream of data is transmitted specifically for each individual client. Web (HTTP) technology is used for delivery by segmenting content into short segment files, typically two to ten seconds duration. These may be further divided into chunks, of for example 1s duration, which can start to be transmitted as soon as they are made. Typically, the client will obtain a manifest file which will allow the URLs of individual files containing video segments to be determined. The client will then request these segments in sequence and concatenate them to form a continuous stream for playback.

Each video segment may also be available at different quality levels, each at a different bit rate (and hence file size). The client device monitors its buffer level and the network throughput achieved and determines from these at which quality to request the next segment in order to achieve a good compromise between media quality and timely delivery. This technique is known as HTTP Adaptive Streaming (HAS). Examples of such techniques include Apple HTTP Live Streaming (HLS) and Microsoft Smooth-Streaming using MPEG DASH (Dynamic Adaptive Streaming over HTTP) protocol.

However, this delivery architecture can cause significant end-to-end delays, with the result that when viewing live action such as live sport, content can appear on the user's screen a significant time after the actual event occurred. By buffering data at the client device before decoding and playing it out, the probability of continuous play-out is increased (that is, the probability of data running out is reduced), but there is a consequential increase in the end-to-end delay or latency.

SUMMARY OF THE INVENTION

It is the aim of examples of the present invention to provide an improved content delivery mechanism.

According to one example of the invention, there is provided a method of delivering media content to a client device, said media content comprising a plurality of segments and wherein each of the segments is encoded at a plurality of bit rates, and said method comprising:
    receiving at the client device a plurality of segments from a server, wherein the most recently received segment is encoded at a first bit rate;
    measuring the delivery time of each of the plurality of segments;
    calculating a first estimate of the delivery rate from the server to the client device using one or more of said measured delivery times;
    calculating a second estimate of the delivery rate from the server to the client device using a plurality of said measured delivery times, wherein the second estimate is calculated over a larger number of the said measured delivery times than the first estimate;
    determining a second encoded bit rate using the first estimate of the delivery rate and the second estimate of the delivery rate; and
    requesting one or more further segments encoded at the second bit rate.

The second bit rate may be determined to be a bit rate lower than the first bit rate when the first estimate of the delivery rate is lower than the first bit rate. The second bit rate may be determined to be a bit rate higher than the first bit rate when the second estimate of the delivery rate is higher than the first bit rate.

The first and second estimates may calculated using further the segment size associated with the segments.

According to one example of the invention, there is provided a client device for receiving media content, said media content comprising a plurality of segments and wherein each of the segments is encoded at a plurality of bit rates, and client device adapted to:
    receive a plurality of segments from a server, wherein the most recently received segment is encoded at a first bit rate;
    measure the delivery time of each of the plurality of segments;
    calculate a first estimate of the delivery rate from the server to the client device using one or more of said measured delivery times;
    calculate a second estimate of the delivery rate from the server to the client device using a plurality of said measured delivery times, wherein the second estimate is calculated over a larger number of the said measured delivery times than the first estimate;
    determine a second encoded bit rate using the first estimate of the delivery rate and the second estimate of the delivery rate; and
    request one or more further segments encoded at the second bit rate.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of media content delivery, where measurements of network delivery rates are used to determine at which bit rate (or quality level) to request each content segment. The aim is to ensure continuous play-out of good quality segments, without relying on a large buffer, so that end-to-end delay is kept low. The historical network delivery rate is measured on two or more timescales, such as a short-term delivery rate and a long-term delivery rate, and these are used to decide when to request a higher bit rate segment than the previous segment, and when to request a lower bit rate segment than the previous segment.

Figure 1:
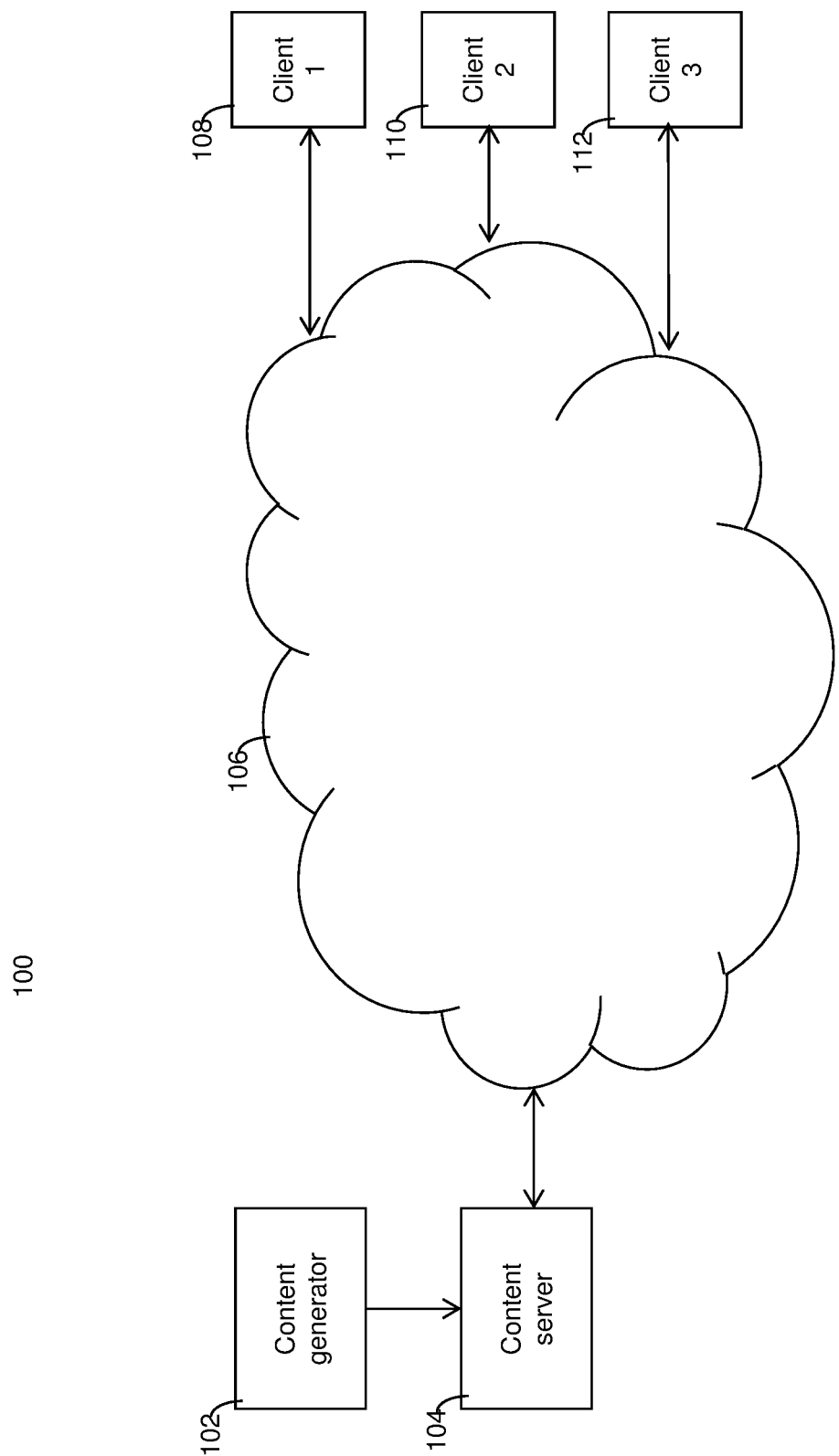
FIG. 1 is a network diagram showing a system in an example of the present invention.

FIG. 1 is a simplified network diagram showing a system 100 comprising a content generator 102 communicating with a content server 104. The content generator 102 is responsible for receiving uncompressed media content, such as live TV, and encoding and packaging the media content to pass to the content server 104. The content server 104 is responsible for storing the received media content, and, on request, delivering the content to suitably configured clients connected over the network 106. In this example, three client devices 108, 110 and 112 are shown. The clients may be video streaming clients adapted to support MPEG DASH or Apple's HLS for example. The clients are adapted to discover media content, request and process manifest files, request segments of the encoded media, and process those segments for viewing.

The content generator 102 receives media content, comprising uncompressed audio video streams, and encodes it into segments of encoded audio and video, typically 2 to seconds in duration. In this example, the video encoding method used is in accordance with the ITU-T H.264 standard, though the invention is not limited to such a standard, and other encoding methods could be used instead. Similarly, the audio encoding method used is MPEG-4 HE AAC v2, though the invention is not limited to such a standard, and other encoding methods could be used instead.

The uncompressed video stream is encoded at multiple bit rates (the associated uncompressed audio stream is usually only encoded at one bit rate, but may also be encoded at multiple bit rates), thus generating an encoded stream for each bit rate. The different bit rates effectively result in different video qualities, with higher bit rate encoding resulting in higher video quality and lower bit rate resulting in lower video quality.

The segments themselves are made up of chunks, with each chunk typically representing about 1 second of audio visual content. However, the invention is not limited to such data representations, and other data representations including segments with short duration, such as 1 second, and with content data not formatted into chunks, could be used instead. This representation with segments consisting of chunks is characteristic of the Common Media Application Format (CMAF), which can be used by the two most common HAS formats: DASH and HLS. The advantage of dividing segments further into smaller chunks, is that their delivery can start as soon as they are made and they can be played out as soon as they are received by the client device. CMAF chunks can be delivered using HTTP/1.1 Chunked Transfer to reduce transmission overhead, which allows for partial HTTP responses, meaning the client device can request a segment once and the corresponding CMAF chunks will be transmitted as soon as they become available in partial HTTP responses.

The encoded segments are passed to the content server 104, where they are stored ready for access by the client devices. Thus, the content server 104 will store multiple streams, each comprising a sequence of content segments encoded at one of a number of bit rates. The content generator 102 also generates a metafile or manifest file describing where the segments files can be accessed (in this case, at a location on the content server 104). When using MPEG-DASH, IS 20009-1, the manifest file is referred to as an MPD (Media Presentation Description). Apple's HLS provides a manifest file in the form of a playlist file (.m3u8 file). The manifest file is also passed onto the content server 104, where it is stored ready for access by the client devices.

Figure 2:
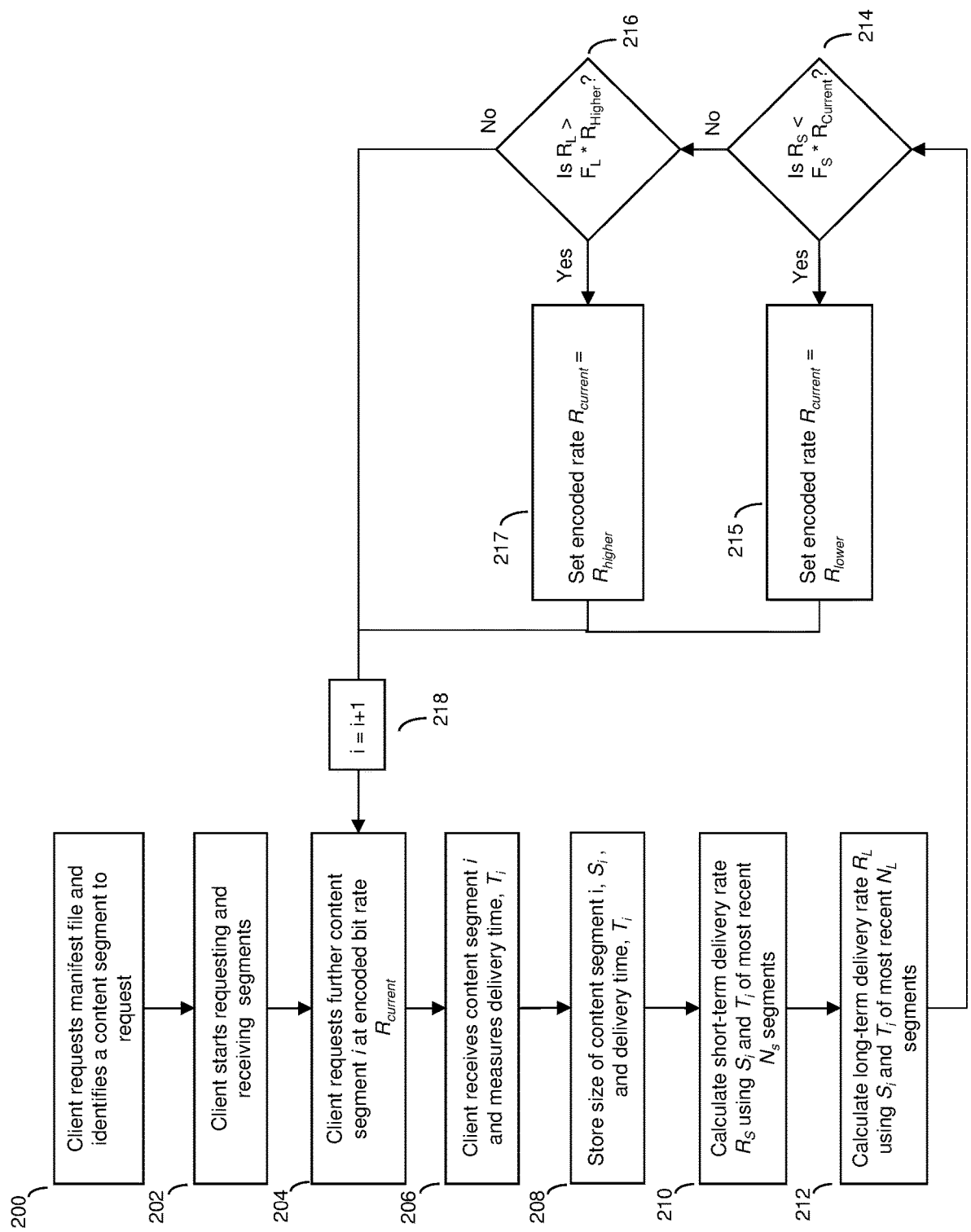
FIG. 2 is a flow chart summarising the main steps of an example of the present invention.

FIG. 2 shows the steps taken at a client device to request and receive encoded media content from the content server 104 in an example of the invention. While the client device is performing these steps, the content server 104 makes each encoded segment available as it receives it from the content generator 102. A manifest file stored at the content server 104 may also be updated with the associated segment information when that segment becomes available at the content server 104.

In step 200, the client device 108 starts by making a request for the manifest file, and identifying a suitable segment to request, the segment being encoded at a particular bit rate. For example, if the segments are encoded at 3 different bit rates (a high, medium and low bit rate), then the identified segment might be one selected from the sequence of segments encoded at a medium bit rate.

In step 202, the client device 108 makes a request, directed at the content server 104, for the identified segment. The content server 104 responds with the requested content segment, which is received by the client device 108. The client device 108 buffers the content segment before decoding and playing out the video. Further content segments from the sequence can be requested and received by the client device 108, and in this manner the client device 108 is able to start streaming video content from the content server 104. The requests made by the content server 108 take the form of HTTP GET requests.

Now, once streaming content segments has started, the client device 108 can start measuring delivery times of requested segments, and use that to determine whether or not to switch to a different bit rate stream. This will now be described with reference to the next steps.

In step 204, the client device 108 makes a request for the next segment i in the sequence at encoded bit rate $R_{current}$ from the content server 104. Note that the current encoded bit rate may be different from the bit rate which previously delivered segments have been encoded at. The aim of methods described is to determine whether to switch to a different bit rate stream with reference to the (current) encoded bit rate of the most recently delivered segment.

The content server 104 responds with the requested segment, and in step 206, the client device 108 receives the segment. The client device 108 also measures the delivery time, $T_i$, of the received segment i.

In step 208, the client device 108 stores an identifier for the segment i, the size of segment i, $S_i$, and the delivery time, Ti.

The client device 108 then calculates the delivery rate associated with content segments over two or more periods of time.

In this example, a first period of time is a short-term period of time covering the most recent $N_S$ segments, and a second period of time is a long-term period of time covering the most recent $N_L$ segments, where $N_L$ is greater than $N_S$. For example, $N_L$ might be 20 segments, and $N_S$ 2 segments.

The short-term delivery rate $R_S$ is calculated over the short-term period of time during which the most recent $N_S$ segments are delivered, and the long-term delivery rate $R_L$ is calculated over the long-term period of time during which the most recent $N_L$ segments are delivered.

Thus, in step 210, the client device 108 can calculates the short-term delivery rate as follows:

$$R_S = \frac{\sum_{i-N_S+1}^{i} S_i}{\sum_{i-N_S+1}^{i} T_i} \quad (1)$$

Equation (1) gives an average delivery rate calculated using the most recent $N_S$ segments.

In step 212, the client device 108 can calculates the long-term delivery rate as follows:

$$R_L = \frac{\sum_{i-N_L+1}^{i} S_i}{\sum_{i-N_L+1}^{i} T_i} \quad (2)$$

Equation (2) gives an average delivery rate calculated using the most recent $N_L$ segments.

Other approaches for calculating the delivery rate over the two periods could be used. For example equation (1) could be replaced with equation (3) below:

$$R_S = \frac{\sum_{i-N_S+1}^{i} S_i / T_i}{N_S} \quad (3)$$

Equation (3) represents the arithmetic mean of the individual rates associated with each segment for the most recent $N_S$ segments.

Another approach is to calculate the delivery rate for each individual segment ($S/T_i$), and then calculate the harmonic mean as shown in equation (4):

$$R_S = \frac{N_S}{\sum_{i-N_S+1}^{i} T_i / S_i} \quad (4)$$

In yet another approach, a median of the individual segment delivery rates can be used.

The harmonic mean has a higher dependence on smaller values than higher values. Hence when it is used to calculate a representative delivery rate from a set of delivery rates, it is not unduly affected by a small number of large values. Hence it can provide a good indication of when it is possible to achieve timely delivery of segments with a higher encoded bit rate, and thus particularly useful for estimating the longer-term delivery rate.

The client device 108 then uses these delivery rates to determine whether to switch stream: to a stream of segments encoded at a lower bit rate; to a stream of segments at a higher bit rate; or to remain with the same bit rate stream.

In step 214 the client device 108 first determines whether to switch to a stream encoded at a lower rate than the current rate $R_{current}$. A test is made to determine if $R_S$ is less than $F_S*R_{current}$, where $F_S$ is a variable that is described in more detail below. If it is, then processing passes to step 215 to trigger a switch to a lower bit rate stream, but if $R_S$ is not less than $F_S*R_{current}$, then processing passes to step 216.

In step 215, the current bit rate $R_{current}$ is set to $R_{lower}$, where $R_{lower}$ is a bit rate lower than the current bit rate. As described in relation to step 200, the client device 108 may start streaming at the middle of three bit rates, and thus if the test in step 214 is satisfied, then a new bit rate is set to the lowest of the three bit rates in step 215. Note, if there is no lower bit rate to select, for example if $R_{current}$ is already the lowest available bit rate, then $R_{current}$ will remain unchanged.

Processing then passes from step 215 to step 218, where the segment number is iterated by setting i=i+1, and then passes back to step 204 where the client device 108 requests the (next) segment i at bit rate $R_{current}$.

However, if the check at step 214 is not satisfied, then processing passes from step 214 to step 216, where a test is made to determine whether to switch to a stream encoded at a higher bit rate than the current bit rate $R_{current}$. In step 216 a test is made to determine if $R_L$ is greater than $F_L*R_{higher}$, where $R_{higher}$ is the bit rate of a stream with bit rate higher than the current bit rate $R_{current}$, and $F_L$ is a variable that is described in more detail below. For example, if the current bit rate is the middle of three, then $R_{higher}$ would be the highest of the three rates. If the test is satisfied, then processing passes to step 217 to trigger a switch to the higher bit rate ($R_{higher}$) stream, but if the test is not satisfied, then processing simply passes to step 218. Note, if there is no higher bit rate than $R_{current}$, then $R_{current}$ will remain unchanged.

In step 217, the current bit rate $R_{current}$ is set to $R_{higher}$, where $R_{higher}$ is a bit rate higher than the current bit rate. Processing then passes from step 217 to step 218, where the segment number is iterated by setting i=i+1, and then passes back to step 204 where the client device 108 requests the (next) segment i at bit rate $R_{current}$.

Note, in step 216, there may be more than one bit rate that is higher than the current rate. In which case, the client device could test each of these higher bit rates in step 216, and then choose to switch to any of these higher bit rates in step 217 that satisfy the test.

However, if the test is not satisfied in step 216, then processing passes to step 218, where the segment number is iterated by setting i=i+1. From step 218 processing passes to step 204, where the client device 108 requests the (next) segment i at bit rate $R_{current}$.

And thus the method is repeated after requesting and receiving each segment, until all segments have been requested or the client device 108 stops making requests (not shown in flow chart).

Returning to the variables $F_S$ and $F_L$. The value of $F_S$ determines when a switch to a lower bit rate encoding occurs. When the value of $F_S$ is 1, switching to a lower bit rate encoding occurs when the short-term delivery rate $R_S$ is less than the current encoding bit rate, $R_{current}$. In some cases it would be better to include a safety margin and switch to a lower bit rate encoding before the short-term delivery rate $R_S$ drops below the current encoding bit rate, $R_{current}$, which could be achieved by setting $F_S$ to a value greater than one, for example, setting $F_S$ to 1.2. While $F_S$ could be set to a constant value in some examples, in other examples it could be set in dependence on the amount of variation observed in the delivery rates of preceding segments, with a larger value being used in the case of higher variation.

The value of $F_L$ determines when a switch to a higher bit rate encoding occurs. When the value of $F_L$ is 1, switching to a higher bit rate encoding occurs when the long-term delivery rate $R_L$ is greater than at least one of the encoding bit rates, $R_{higher}$, that is higher than the current encoding bit rate, $R_{current}$. In some cases it would be better to include a safety margin and switch to a higher bit rate encoding only when the long-term delivery rate $R_L$ exceeds a higher encoding bit rate by a particular fraction. This could be achieved by setting $F_L$ to a value greater than one, for example, setting $F_L$ to 1.2. While $F_L$ could be set to a constant value in some examples, in other examples it could be set in dependence on the amount of variation observed in the delivery rates of preceding segments, with a larger value being used in the case of higher variation.

$F_S$ and $F_L$ can be set either dependently or independently and may have the same value or different values.

Note, the client device 108 may request an updated manifest file as required as further content segments are made available at the content server 104.

It should be noted that whilst the above examples have been described with reference to content segments, the method can be equally applied to delivery of chunks instead. For example, when using HTTP/1.1 Chunked Transfer, if the requested segments contain chunks, then each chunk is pushed to the client device as they become available if the complete segment is not fully available (not all chunks available). However, if a requested segment is fully available (all chunks are available), then the entire segment is delivered.

Examples of the invention are realised, at least in part, by executable computer program code which may be embodied in an application program data. When such computer program code is loaded into the memory of the CPU in the client device 108, it provides a computer program code structure which is capable of performing at least part of the methods in accordance with the above described exemplary embodiments of the invention.

A person skilled in the art will appreciate that the computer program structure referred can correspond to the flow chart shown in FIG. 2, where each step of the flow chart can correspond to at least one line of computer program code and that such, in combination with the CPU in the client device 108, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of delivering media content to a client device, said media content comprising a plurality of segments and wherein each of the segments is encoded at a plurality of bit rates, and said method comprising:
receiving at the client device a plurality of segments from a server, wherein the most recently received segment is encoded at a first encoded bit rate;
measuring the delivery time of each of the plurality of segments;
calculating a first estimate of the delivery rate from the server to the client device using one or more of said measured delivery times;
calculating a second estimate of the delivery rate from the server to the client device using a plurality of said measured delivery times, wherein the second estimate is calculated over a larger number of the said measured delivery times than the first estimate;
either determining a second encoded bit rate to be a bit rate lower than the first encoded bit rate if the first estimate is lower than a first function of the first encoded bit rate, or determining the second encoded bit rate to be a bit rate higher than the first encoded bit rate if the second estimate is higher than a second function of another encoded bit rate, wherein the another encoded bit rate is higher than the first encoded bit rate; and
requesting by the client device one or more further segments encoded at the second encoded bit rate.

2. A method according to claim 1, wherein calculating the first and second estimates further use the segment size associated with the segments.

3. A client device for receiving media content, said media content comprising a plurality of segments and wherein each of the segments is encoded at a plurality of bit rates, and client device adapted to:
receive a plurality of segments from a server, wherein the most recently received segment is encoded at a first encoded bit rate;
measure the delivery time of each of the plurality of segments;
calculate a first estimate of the delivery rate from the server to the client device using one or more of said measured delivery times;
calculate a second estimate of the delivery rate from the server to the client device using a plurality of said measured delivery times, wherein the second estimate is calculated over a larger number of the said measured delivery times than the first estimate;
either determine a second encoded bit rate to be a bit rate lower than the first bit rate if the first estimate is lower than a first function of the first encoded bit rate, or determine the second encoded bit rate to be a bit rate higher than the first bit rate if the second estimate is higher than a second function of another encoded bit rate, wherein the another encoded bit rate is higher than the first encoded bit rate; and
request one or more further segments encoded at the second encoded bit rate.

4. The client device according to claim 3, wherein calculation of the first and second estimates further use the segment size associated with the segments.

* * * * *